Patented July 5, 1932

1,865,477

UNITED STATES PATENT OFFICE

WILLIAM E. MESSER, OF NAUGATUCK, CONNECTICUT, ASSIGNOR TO THE NAUGATUCK CHEMICAL COMPANY, OF NAUGATUCK, CONNECTICUT, A CORPORATION OF CONNECTICUT

MANUFACTURE OF MERCAPTO BENZOTHIAZOLE

No Drawing. Application filed September 22, 1930. Serial No. 483,757.

The present invention relates to a process of preparing mercapto-aryl-thiazole compounds whereby high yields of the desired compounds may be obtained in substantially pure form.

It is known that aniline and sulphur will react to produce what is termed crude aniline disulphide (O-O'-diamino diphenyl disulphide), the reaction proceeding according to the following equations:

(1) 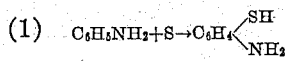

(2) 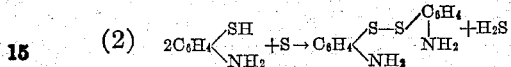

According to A. W. Hofman, B. 20, 1792-3 (1887) aniline disulphide and carbon disulphide will react to form mercapto benzo thiazole. No directions are given other than are involved in the equation mentioned which is (3) 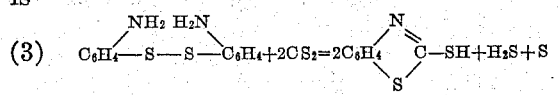

It has been found that if aniline and sulphur are used as the starting materials and their reaction product reacted with carbon disulphide according to the molecular quantities of reactions taught by Hofman that only about 30% by weight of the mercaptobenzo-thiazole based on the aniline employed, is obtained. Such a low yield is not desired commercially and means of increasing this yield forms one of the contributions of this invention.

It has now been discovered that if an amount of carbon disulphide in excess of the molecular quantity called for by the Equation (3) is used, that the yield of mercaptobenzo-thiazoles can be considerably increased, particularly when the molecular excess used is from 33-100% of that required by the above Equation (3). In this way there are obtained yields as high as 88% by weight of mercapto benzo thiazole based on the aniline originally employed. The reason why an excess of carbon disulphide operates to give such increased yields is not known. A possible theory here advanced is that undesired side reaction products may occur in the reaction of Equation (3) to reduce the theoretical yield of the desired compound, whereas an excess of the carbon disulphide either reduces the degree of formation of such side reaction products or operates in some way to convert them into the desired compound.

The invention accordingly comprises reacting aniline and sulphur, heating, preferably under pressure, the reaction product, before or after removal of unreacted materials, with carbon disulphide in amounts substantially in excess of that called for by Equation (3) above, and recovering the 1-mercapto-benzo-thiazole (American system of nomenclature) formed, either in crude condition or purified. The conditions of the reaction, except the proportions called for as stated, may be varied as is found suitable. It may be stated, however, that the best results have been obtained when the temperature of refluxing of aniline and sulphur is between substantially 180° C. and substantially 205° C., and the reaction with carbon disulphide is between substantially 140° C. and substantially 170° C. The pressures in the last mentioned reaction may range from 100-500 lbs. per sq. in. and the time accordingly to the temperatures and pressures used.

*Example 1.*—540 lbs. aniline and 300 lbs. sulphur are refluxed together for 10 hrs. at 180-185° C., the resulting product is cooled and steam distilled recovering 312 lbs. aniline in all. The 150 gallon autoclave containing the product is then evacuated and heated to get rid of substantially all the excess water. 225 lbs. of carbon disulphide is then added and the charge heated to 150-160° C. for 9 hrs. The pressure rises to about 400 lbs. per square inch and then gradually falls off. The autoclave is then cooled and blown off. The reaction product is then extracted with 115 lbs. sodium hydroxide and the alkaline solution allowed to settle. The supernatant liquid is drawn off and acidified with about 30% sulphuric acid with stirring. The precipitated mercapto benzo thiazole is filtered off and washed. This product is dissolved in a solution of 135 lbs. of soda ash in water and filtered, care being used to use containers which do not tend to discolor the product. The filtrate is acidified, filtered and the precipitate is washed and dried. Approximately 224 lbs. of 1-mercapto-benzo-thiazole (American system of nomenclature) is produced having a melting range of 160–168° C.

*Example 2.*—540 lbs. aniline and 300 lbs. sulphur are refluxed together for 10 hrs. at 180–185° C., the resulting product is cooled and subjected to direct vacuum distillation recovering 320 lbs. aniline in all. 220 lbs. of carbon disulphide is then added and the charge heated to 150–160° C. for 9 hrs. The pressure rises to about 400 lbs. per square inch and then gradually falls off. The autoclave is then cooled and blown off. The reaction product is then extracted with 100 lbs. sodium hydroxide and the alkaline solution allowed to settle. The supernatant liquid is drawn off and acidified with sulphuric acid with stirring. The precipitated mercapto-benzo-thiazole is filtered off and washed. This product is dissolved in a solution of 125 lbs. of soda ash in water and filtered, care being used to use containers which do not tend to discolor the product. The filtrate is acidified, filtered and the precipitate is washed and dried. Approximately 225 lbs. of 1-mercapto-benzo-thiazole (American system of nomenclature) are produced having a melting range of 161–169° C.

Instead of benzo thiazoles other aryl thiazoles such as the mercapto-tolyl and xylyl thiazoles may be prepared in a like manner. It is to be understood that applicant is not to be bound by any theories advanced herein, and the invention is not to be limited except as set forth in the appended claims.

Having thus described my invention, what I claim and desire to protect by Letters Patent is:

1. A process of manufacturing a mercapto-aryl-thiazole compound which comprises heating under pressure the preformed reaction product of at least substantially 2 moles of a primary aryl amine and at least substantially 3 moles of sulphur with an amount of carbon disulphide in molecular excess of that theoretically required to form the desired thiazole compound.

2. A process of manufacturing a mercapto-aryl-thiazole compound which comprises reacting at least substantially 2 moles of a primary aryl amine and at least substantially 3 moles of sulphur, removing unreacted primary arylamine and heating under pressure the resulting reaction product with an amount of carbon disulphide in molecular excess of that theoretically required to form the desired thiazole compound.

3. A process of manufacturing mercapto-benzo-thiazole which comprises reacting aniline and sulphur to form aniline disulphide, removing unreacted aniline and heating under pressure the aniline disulphide with an amount of carbon disulphide in molecular excess of that theoretically required to form mercapto-benzo-thiazole.

4. A process of manufacturing mercapto-benzo-thiazole which comprises reacting aniline and sulphur to form aniline disulphide, removing unreacted aniline and heating under pressure the aniline disulphide with an amount of carbon disulphide in molecular excess of that theoretically required to form mercapto-benzo-thiazole, and separating and purifying the mercapto-benzo-thiazole formed.

5. A process of manufacturing mercapto-benzo-thiazole which comprises reacting under heat and pressure O-O'-diamino diphenyl disulphide with a substantial excess of carbon disulphide over that theoretically required to produce mercapto-benzo-thiazole, extracting the mercapto-benzo-thiazole with an alkali and subsequently separating and purifying the mercapto-benzo-thiazole.

6. A process of manufacturing mercapto-benzo-thiazole which comprises reacting aniline and sulphur to form O-O' diamino diphenyl disulphide, removing unreacted aniline and heating under pressure the O-O' diamino diphenyl disulphide with a substantial excess of carbon disulphide over that theoretically required to produce mercapto-benzo-thiazole, extracting the mercapto-benzo-thiazole with an alkali, and subsequently separating and purifying the mercapto-benzo-thiazole.

7. A process of manufacturing mercapto-benzo-thiazole which comprises reacting aniline and sulphur at a temperature between substantially 180° C. and substantially 205° C. to form O-O' diamino diphenyl disulphide, removing unreacted aniline, and heating the O-O' diamino diphenyl disulphide with an amount of carbon disulphide in molecular excess of that theoretically required to form mercapto-benzo-thiazole at a pressure between substantially 100 and substantially 500 lbs. per sq. in. and a temperature between substantially 140 and substantially 170° C. and separating and recovering mercapto-benzo-thiazole.

Signed at Naugatuck, county of New Haven, State of Connecticut, this 18th day of September, 1930.

WILLIAM E. MESSER.